(12) United States Patent
Hughes et al.

(10) Patent No.: US 7,971,896 B2
(45) Date of Patent: Jul. 5, 2011

(54) TOWING HITCH APPARATUS AND METHOD

(75) Inventors: Andy Hughes, Livonia, NY (US); Robb Augustine, Dublin, OH (US); Jamison Weirup, Marysville, OH (US); Jeremy Lucas, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 12/347,765

(22) Filed: Dec. 31, 2008

(65) Prior Publication Data

US 2009/0218788 A1   Sep. 3, 2009

Related U.S. Application Data

(60) Provisional application No. 61/017,896, filed on Dec. 31, 2007.

(51) Int. Cl.
*B60D 1/14* (2006.01)
(52) U.S. Cl. .................... 280/495; 280/500
(58) Field of Classification Search .......... 280/500, 280/502, 505, 497
See application file for complete search history.

(56) References Cited

U.S. PATENT DOCUMENTS

| | | |
|---|---|---|
| 1,641,502 A | 9/1927 | Price |
| 2,090,857 A | 8/1937 | White |
| 2,492,914 A | 12/1949 | Barden |
| 2,649,308 A | 8/1953 | Bice, Jr. |
| 2,717,164 A | 9/1955 | Meyer |
| 3,140,071 A * | 7/1964 | Lorentzen ............ 248/273 |
| 3,318,617 A | 5/1967 | Burns |
| 3,501,170 A | 3/1970 | Valle |
| 3,578,358 A * | 5/1971 | Reynolds ............ 280/500 |
| 3,606,385 A | 9/1971 | Johannes |
| 3,698,609 A | 10/1972 | Lund |
| 4,239,253 A | 12/1980 | Golze |
| 4,487,446 A | 12/1984 | Reich, II |
| 4,893,856 A | 1/1990 | Council |
| 4,929,028 A | 5/1990 | Underwood |
| 5,094,469 A | 3/1992 | Yamamoto et al. |
| 5,102,156 A * | 4/1992 | Fink et al. ............ 280/495 |
| 5,193,837 A * | 3/1993 | Fink et al. ............ 280/495 |
| 5,277,448 A | 1/1994 | Colibert |

(Continued)

FOREIGN PATENT DOCUMENTS

DE          29823354          5/1999

(Continued)

*Primary Examiner* — Kevin Hurley
*Assistant Examiner* — Tashiana Adams
(74) *Attorney, Agent, or Firm* — Kenealy Vaidya LLP; Mark E. Duell

(57) ABSTRACT

A towing hitch assembly for use with a vehicle and method is provided and includes a towing hitch frame structure, the towing hitch frame structure having a front surface, a top surface, and a bottom surface. The front surface can be configured to face away from the vehicle. A towing hitch can be located adjacent the towing hitch frame structure, and a mounting assembly can be configured to mount the towing hitch frame structure to a vehicle frame. The mounting assembly can include a first bracket configured to be adjacent the vehicle frame, and a second bracket capable of receiving the first bracket, the second bracket extending along the bottom surface and the front surface of the towing hitch frame structure. The towing hitch assembly according to the disclosed subject matter provides for, among other features, improved styling, safety, loading and bumper attachment.

20 Claims, 4 Drawing Sheets

U.S. PATENT DOCUMENTS

| | | |
|---|---|---|
| 5,489,111 A | 2/1996 | Collins |
| 5,560,576 A * | 10/1996 | Cargill ................. 248/231.61 |
| 5,620,218 A | 4/1997 | Saltzman et al. |
| 5,716,066 A | 2/1998 | Chou et al. |
| 5,873,594 A * | 2/1999 | McCoy et al. ............ 280/491.5 |
| D409,961 S | 5/1999 | Marsceau et al. |
| 6,139,044 A | 10/2000 | Smith et al. |
| 6,179,320 B1 | 1/2001 | Chou et al. |
| 6,203,078 B1 * | 3/2001 | Karrer ..................... 293/111.1 |
| 6,402,179 B1 * | 6/2002 | Morris et al. ................ 280/495 |
| 6,502,848 B1 | 1/2003 | Chou et al. |
| 6,578,864 B2 | 6/2003 | McCoy et al. |
| 6,581,955 B2 | 6/2003 | Aquinto et al. |
| 6,601,868 B1 | 8/2003 | McCoy et al. |
| 6,634,666 B2 | 10/2003 | Shilitz et al. |
| 6,669,223 B2 | 12/2003 | Sekaria et al. |
| 6,739,613 B2 | 5/2004 | Aquinto et al. |
| 6,746,038 B2 | 6/2004 | McCoy et al. |
| 6,846,001 B2 | 1/2005 | Seksaria et al. |
| 6,851,695 B2 * | 2/2005 | Lindenman et al. .......... 280/441 |
| 7,055,844 B1 * | 6/2006 | Bostedt ..................... 280/491.5 |
| 7,100,936 B1 * | 9/2006 | Cheng et al. .................. 280/495 |
| 7,114,741 B2 * | 10/2006 | Marvin L. et al. ............ 280/495 |
| 7,121,573 B2 * | 10/2006 | Lindenman et al. .......... 280/433 |
| 7,156,411 B2 | 1/2007 | Jaekel et al. |
| 7,156,433 B2 * | 1/2007 | Evans ........................... 293/120 |
| 7,677,514 B1 | 3/2010 | Palmer ........................ 248/250 |
| 7,690,672 B2 * | 4/2010 | Scruggs .................... 280/491.2 |
| 2001/0035628 A1 * | 11/2001 | McCoy et al. ................ 280/495 |
| 2003/0011169 A1 * | 1/2003 | McCoy et al. ............. 280/491.2 |
| 2003/0189313 A1 * | 10/2003 | Sievers ........................ 280/507 |
| 2004/0012213 A1 | 1/2004 | Dellock et al. |
| 2004/0021295 A1 | 2/2004 | Westerdale |
| 2006/0006626 A1 * | 1/2006 | Scruggs ........................ 280/495 |
| 2006/0186637 A1 | 8/2006 | Scruggs |

FOREIGN PATENT DOCUMENTS

| | | |
|---|---|---|
| JP | 11334329 | 12/1999 |
| JP | 20000296742 | 10/2000 |

* cited by examiner

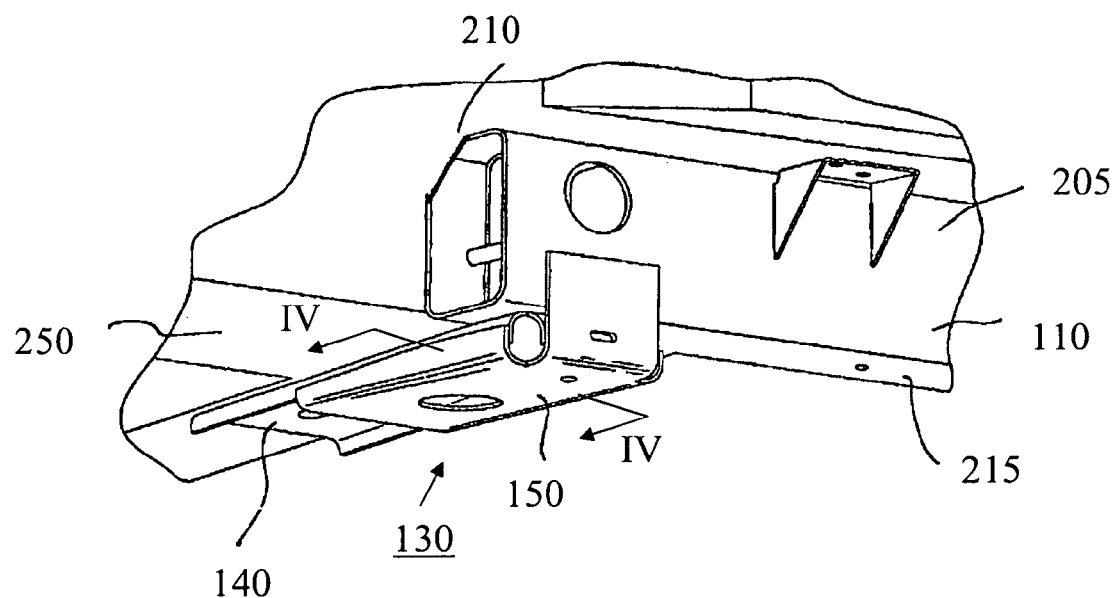
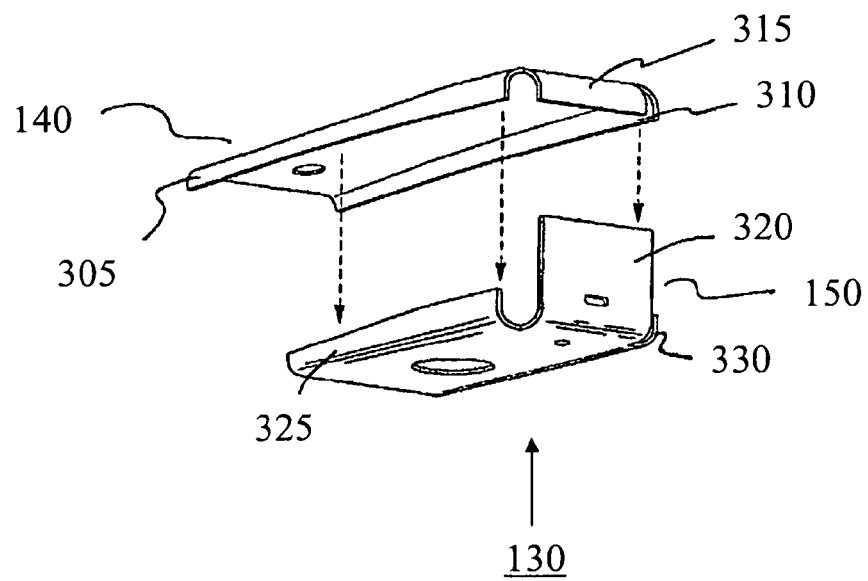

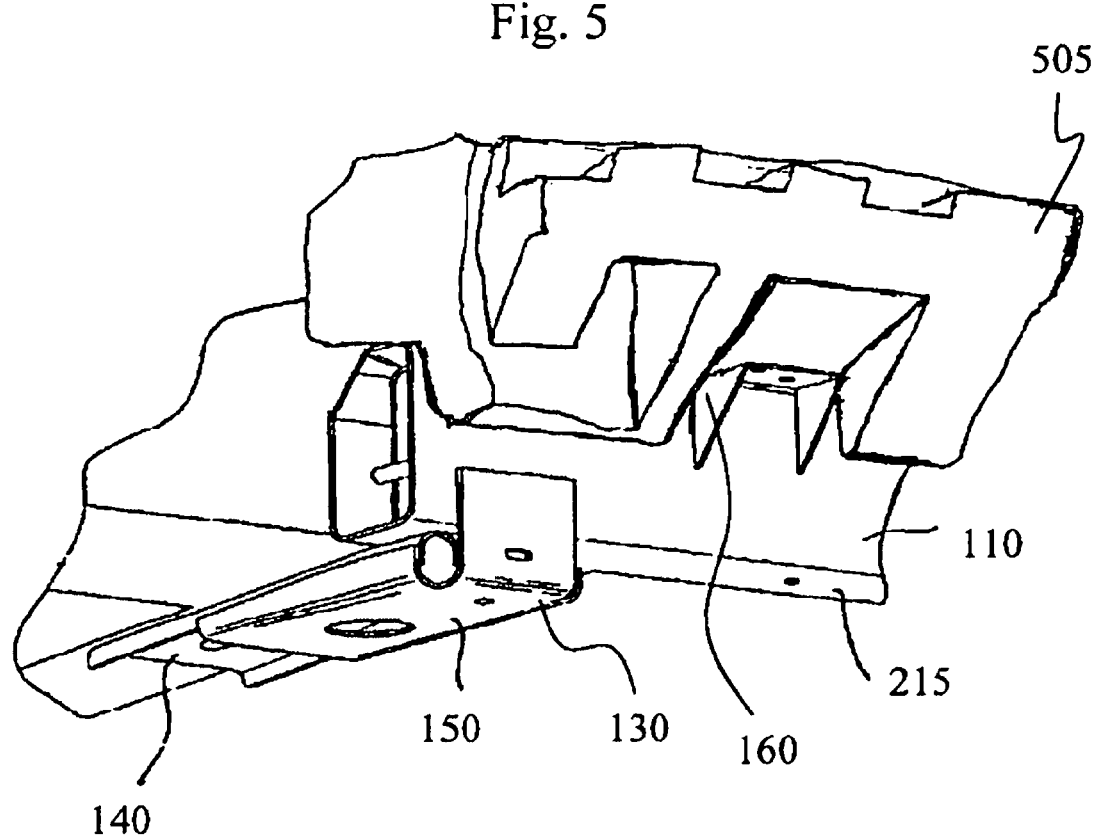

TOWING HITCH APPARATUS AND METHOD

This application claims the priority benefit under 35 U.S.C. §119 of U.S. Provisional Patent Application No. 61/017,896 filed on Dec. 31, 2007, which is hereby incorporated in its entirety by reference.

BACKGROUND

1. Field

The presently disclosed subject matter relates to a towing hitch apparatus, and more particularly, to a towing hitch apparatus that can be mounted directly to a vehicle frame and a method for mounting a towing hitch.

2. Brief Description of the Related Art

Typically, motor vehicles are assembled with a rear bumper assembly in order to protect the vehicle and its passengers and others during rear end collisions, to provide an attachment structure for lighting assemblies, to provide design features, etc. In many cases, a separate tow hitch assembly is provided below the rear bumper so as to allow the vehicle to tow another vehicle or a trailer. These separate tow hitch assemblies are typically attached to the vehicle frame and include a cross beam that extends transversely across the rear end of the vehicle. A tow hitch receiver is then welded to the cross beam. These conventional tow hitch assemblies are generally made of heavy materials such as steel, etc. Thus, the combination of the tow hitch assembly and bumper assembly often adds a significant amount of weight to the vehicle, which can result in reduced fuel economy. The conventional tow hitch assemblies are also low to the ground which can reduce design choice, reduce towing ability, and raise certain safety concerns.

Therefore, it would be desirable to provide an integrated rear bumper assembly and towing hitch assembly which is compact and lighter in weight than the conventional tow hitch and rear bumper assemblies. It would also be desirable to provide a towing hitch assembly that is higher from the ground than conventional assemblies and which can be better incorporated into a bumper system for design purposes, varied towing ability, etc.

SUMMARY

According to an aspect of the disclosed subject matter, a towing hitch assembly for mounting to a vehicle can include a towing hitch frame structure, the towing hitch frame structure having a front surface, a top surface, and a bottom surface, the front surface configured to face away from the vehicle, a towing hitch located adjacent the towing hitch frame structure, and a mounting assembly configured to mount the towing hitch frame structure to a vehicle frame. The mounting assembly can include a first bracket configured to be adjacent the vehicle frame, and a second bracket capable of receiving the first bracket, the second bracket extending along the bottom surface and the front surface of the towing hitch frame structure. In one embodiment, the second bracket may be L-shaped so that a portion of the second bracket is affixed to the front surface of the towing hitch frame. The first and second brackets may be welded together in one embodiment. In another embodiment, the first and second brackets may be bolted together or bonded together using an adhesive. In one embodiment, the mounting assembly is affixed to both the vehicle frame and the vehicle hitch frame structure using bolts, or alternatively through adhesive bonding, or through a welding process.

According to another aspect of the disclosed subject matter, the vehicle tow hitch assembly can be integrated with a bumper assembly resulting in a compact and light-weight solution.

According to yet another aspect of the disclosed subject matter, at least one accessory attachment bracket is provided adjacent the towing hitch frame structure which allows various accessories, such as a step, to be mounted on the frame structure.

According to still another aspect of the disclosed subject matter, the vehicle tow hitch assembly is located higher from the ground compared to conventional systems provides various crash safety benefits, styling benefits and allows the assembly to be utilized as a step for certain types of vehicles, such as sport utility vehicles (SUVs).

According to still another aspect of the disclosed subject matter, a method for mounting a towing hitch to a vehicle frame of a vehicle can include providing a vehicle frame including a lower surface facing downward away from a bottom of the vehicle and a front surface facing away from a rear of the vehicle, a towing hitch frame structure including a towing hitch configured to connect to a vehicle trailer structure, the towing hitch frame structure having a front surface, a top surface, and a bottom surface, the front surface configured to face away from a rear of the vehicle, a primary bracket including a primary surface, and a secondary bracket including a secondary surface and an extension portion extending at a substantial angle with respect to the secondary surface. The method can further include connecting the primary bracket to the secondary bracket such that the primary surface is spaced from the secondary surface. The method can also include attaching at least one of the primary bracket and the secondary bracket to the vehicle frame such that at least one of the primary surface and the secondary surface extends along both the lower surface of the vehicle frame and the bottom surface of the towing hitch frame structure and the extension portion extends along the front surface of the towing hitch frame structure.

According to yet another aspect of the disclosed subject matter, a towing hitch assembly for mounting to a vehicle can include a towing hitch frame structure, the towing hitch frame structure having a front surface, a top surface, and a bottom surface, the front surface configured to face away from a rear of the vehicle. The towing hitch assembly can further include a vehicle frame including a bottom surface and a front surface configured to face away from a rear of the vehicle, the bottom of the vehicle frame being substantially co-planar with the bottom surface of the towing hitch frame structure. A towing hitch can be located adjacent the towing hitch frame structure. A mounting assembly can be configured to mount the towing hitch frame structure to the vehicle frame, the mounting assembly including a bracket structure that has a primary surface extending along both the bottom surface of the vehicle frame and the bottom surface of the towing hitch frame structure, the bracket structure including an extension portion that includes a secondary surface that is configured at an angle greater than zero with respect to the primary surface and extends along the front surface of the towing hitch frame structure.

Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the appa

FIG. 2 illustrates an enlarged perspective view of the towing hitch apparatus of FIG. 1;

FIG. 3 illustrates an exploded perspective view of an exemplary mounting assembly made in accordance with principles of the disclosed subject matter;

FIG. 5 illustrates a cross-sectional view of an exemplary towing hitch apparatus including an accessory mounting bracket made in accordance with principles of the disclosed subject matter.

DETAILED DESCRIPTION OF EXEMPLARY EMBODIMENTS

Figure 1:
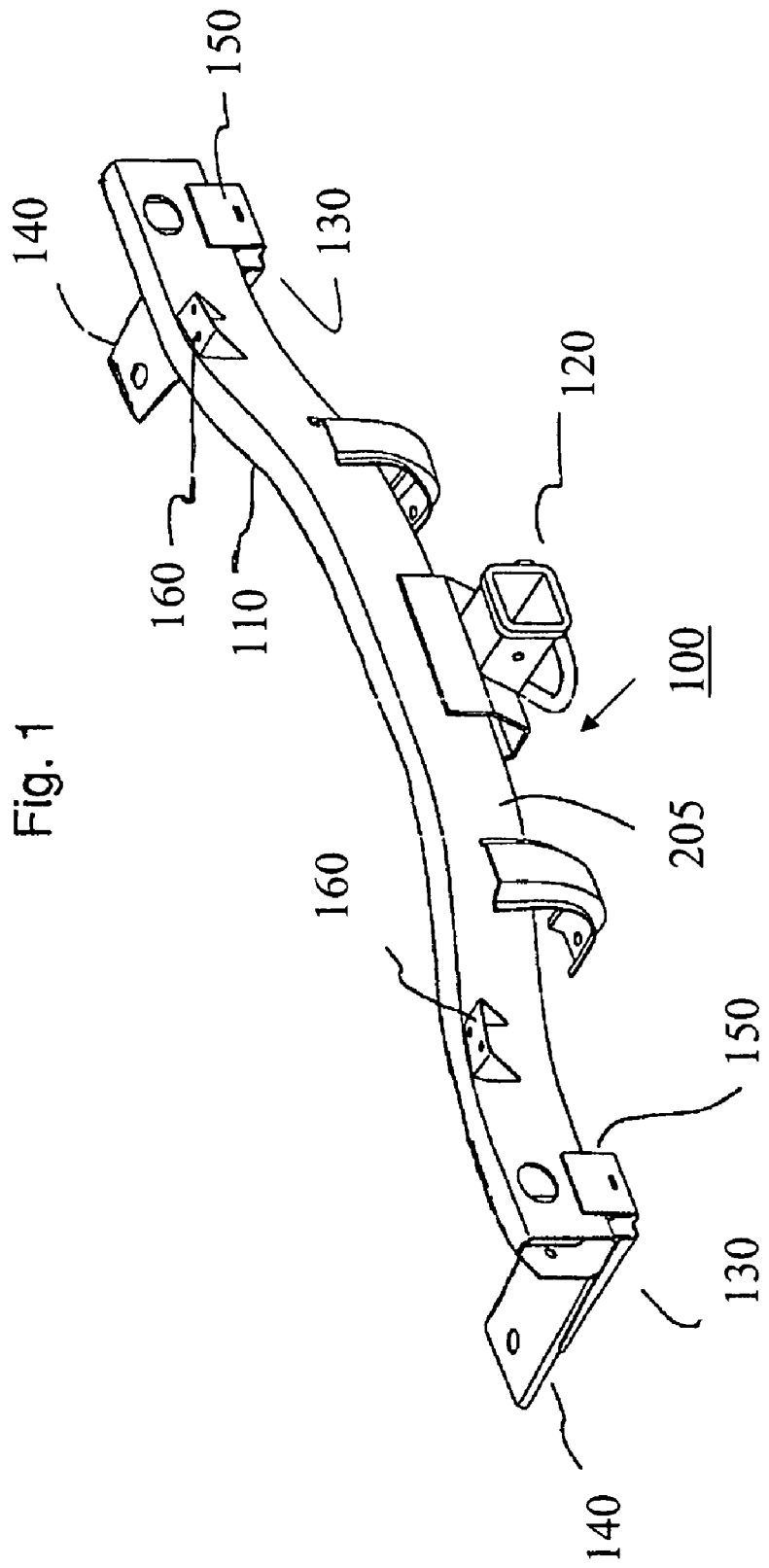
- FIG. 1 illustrates a perspective view of an exemplary towing hitch apparatus made in accordance with principles of the disclosed subject matter.

Referring to the drawing figures, like reference numerals designate identical or corresponding elements throughout the several figures.

FIG. 1 illustrates a perspective view of an exemplary embodiment of a towing hitch assembly 100 made in accordance with the principles of the disclosed subject matter. As shown in FIG. 1, the towing hitch assembly includes a towing hitch frame structure 110, a towing hitch 120 coupled to towing hitch frame structure 110 and a mounting assembly 130 located at opposite ends of the towing hitch frame structure 110. FIG. 1 also shows accessory attachment brackets 160 which are disposed adjacent a front surface 205 of the towing hitch frame structure 110. The towing hitch frame structure 110 of FIG. 1 can be described as a cross beam having any number of cross-sectional shapes, including rectangular, triangular, polygonal, non-symmetrical, etc. This cross beam is sized so as to extend along the width a vehicle to which it is mounted. It should be understood, however, that the towing hitch frame structure 110 according to the disclosed subject matter can take on any number of shapes and configurations capable of being coupled to a vehicle's frame and capable of receiving the towing hitch 120. The towing hitch 120 is located adjacent to the towing hitch frame structure 110 and may be positioned at any point along the towing hitch frame structure 110. As shown in FIG. 1, the towing hitch may be located at about the center of the towing hitch structure 110. One end of the towing hitch 120 may be coupled to the towing hitch frame structure 110, while another end is capable of being coupled to another object, such as a trailer for towing various structures or vehicles. Coupling of the towing hitch 120 to the towing hitch frame structure 110 can be accomplished by a variety of mechanisms, including through welding or the use of various fasteners, such as bolts, screws or adhesives.

The mounting assembly 130 is located at each end of the towing hitch frame structure 110 and facilitates attachment of the towing hitch frame structure 110 to a vehicle frame. An exemplary configuration of the mounting assembly 130 will be described below in greater detail but as can be seen from FIG. 1, can include a first bracket 140 in communication with a second bracket 150.

FIG. 2 is a perspective view showing the mounting assembly 130 in greater detail. As shown in FIG. 2, the mounting assembly 130 is affixed to the towing hitch frame structure 110. In this embodiment, the towing hitch frame structure 110 has a five-sided polygonal cross-sectional shape. The towing hitch frame structure 110 has a front surface 205, a top surface 210 and a bottom surface 215. The mounting assembly 130 includes a first bracket 140 and a second bracket 150. The second bracket 150 receives the first bracket 140 in such a manner as to form a "clamshell" structure. In one embodiment of the invention, the first bracket 140 and the second bracket 150 are MIG welded together to form the "clamshell" structure. In another embodiment, the first bracket 140 is bolted to the second bracket 150. The mounting assembly 130 is affixed to both a vehicle frame 250 and the bottom surface 215 of the towing hitch frame 110 through the use of a welding process, bolts, or other attachment structure(s). In the embodiment of FIG. 2, the second bracket 150 has an L-shape so that a portion of it is affixed to the front surface 205 of the towing hitch frame 110. In this manner, the towing hitch frame structure 110 is mounted to the vehicle frame 250 via the mounting assembly 130.

FIG. 3 shows a perspective view of the mounting assembly 130 before the first bracket 140 is placed into contact with the second bracket 150. The arrows shown in FIG. 3 illustrate the manner in which the first and second brackets are coupled together to form a "clamshell" mounting assembly. In the embodiment of FIG. 3, the first bracket has a first curved lip 305, an opposing second curved lip 310 and a third curved lip 315. Each of the first curved lip 305, the second curved lip 310 and the third curved lip 315 are curved in the direction of the second bracket 150. The second bracket 150 has a first curved edge 325 and an opposing second curved edge 330. The second bracket also has an extension edge 320 that can be L-shaped. The second bracket 150 is capable of receiving the first bracket 140 in a manner such that the first curved lip 305 is in contact with the first curved edge 325, the second curved lip 310 is in contact with the second curved edge 330 and the third curved lip 315 is in contact with the L-shaped edge 320. In one embodiment, the first bracket 140 is welded to the second bracket 150 at the points of contact described above. In another embodiment, the first bracket 140 is affixed to the second bracket 150 through the use of bolts or other attachment structure(s).

Figure 4:
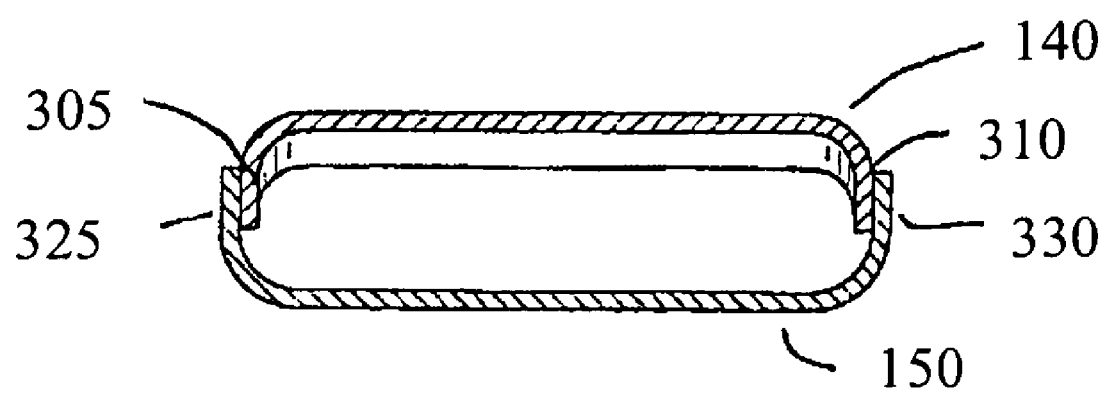
FIG. 4 illustrates a cross-sectional view of the mounting assembly taken along line IV-IV of FIG. 2.

FIG. 4 shows a cross sectional view of the first bracket 140 and the second bracket 150 taken along line IV-IV of FIG. 2. FIG. 4 shows that the second bracket 150 is capable of receiving the first bracket 140 so as to form a "clamshell" bracket. FIG. 4 also shows that the first curved lip 305 is in contact with the first curved edge 325 and the second curved lip 310 is in contact with the second curved edge 330. In one embodiment of the disclosed subject matter, the first curved lip 305 and the first curved edge 325 may be welded together, while the second curved lip 310 may be welded to the second curved edge 330. Alternatively, the curved lip 305 can be affixed to the curved edge 325 though the use of bolts or adhesives. In addition, each of the brackets could be directly connected to the vehicle frame without direct connection between brackets.

FIG. 5 shows a perspective view of another embodiment of a towing hitch assembly 100. FIG. 5 shows the towing hitch frame structure 110 and the mounting assembly 130, which includes a first bracket 140 and a second bracket 150. A step accessory 505 is mounted on the towing hitch frame structure 110 and is supported by the accessory attachment bracket 160. The combination of the accessory attachment bracket 160 and the towing hitch frame structure 110 provides support for the step accessory 505 allowing it to support loads. Typically, the step accessory 505 is used to allow a user to easily access either items in the vehicle or the vehicle itself. For example, if the step accessory 505 is used on a pick-up truck, a user can climb into the bed of the truck by mounting/climbing on the step accessory 505.

Of course, other accessories can be mounted on the hitch frame structure 110 such as clips, bike mounts, light assemblies, etc.

It should be noted that several of the disclosed structures that make up the hitch mount can be varied in terms of shape, size, material, connections, etc., without departing from the spirit and scope of the presently disclosed subject matter. For example, the first bracket 140 and second bracket 150 can be configured differently, such as including different shaped brackets and different connection criteria. Specifically, the bracket 140 is shown as fitting in clam-shell type fashion into bracket 150. However, it is possible that the bracket 150 fits within bracket 140 or that each of the brackets 140 and 150 mate in a different manner with each other. The shape of the brackets 140 and 150 can also differ from the shape shown in the Figures. For example, the brackets 140 and 150 could be rounded or oval in plain view, triangular, etc. The upper bracket could include the extension or L-shaped edge that is attached to the front surface 205 of the hitch frame structure 110. It is also possible that the brackets 140 and 150 can be combined into a single, unitary structure that could be formed via extrusion or casting, etc., and results in a shape that is similar to that of the final structure when brackets 140 and 150 are attached to each other.

Also, the shape of the structure when brackets 140 and 150 are attached to each other can become thicker from a distal portion to a proximal portion along a longitudinal axis of the brackets 140 and 150. The shape can remain the same thickness or become thinner depending on various design, structural strength, and other requirements.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A towing hitch assembly for mounting to a vehicle, comprising:
   a towing hitch frame structure, the towing hitch frame structure having a front surface, a top surface, and a bottom surface, the front surface configured to face away from the vehicle;
   a towing hitch located adjacent the towing hitch frame structure; and
   a mounting assembly configured to mount the towing hitch frame structure to a vehicle frame, the mounting assembly including
      a first bracket configured to be adjacent the vehicle frame, and
      a second bracket capable of receiving the first bracket, the second bracket extending along the bottom surface and the front surface of the towing hitch frame structure.

2. The towing hitch assembly according to claim 1, wherein towing hitch frame structure is a cross beam.

3. The towing hitch assembly according to claim 1, wherein the second bracket is adjacent to the bottom surface and the front surface of the vehicle frame.

4. The towing hitch assembly according to claim 1, wherein the second bracket is L-shaped.

5. The towing hitch assembly according to claim 1, wherein the first bracket and the second bracket are welded together.

6. The towing hitch assembly according to claim 1, wherein the mounting assembly is affixed to the towing hitch frame structure and vehicle frame through the use of one of a weld, an adhesive, and at least one bolt.

7. The towing hitch assembly according to claim 1 further comprising:
   an accessory attachment bracket disposed adjacent the front surface of the towing hitch frame structure.

8. The towing hitch assembly according to claim 1, wherein the first bracket includes a first curved lip, an opposing second curved lip, and a third curved lip.

9. The towing hitch assembly according to claim 8, wherein the second bracket includes a first curved edge, an opposing second curved edge, and a third L-shaped curved edge.

10. The towing hitch assembly according to claim 9, wherein the first curved lip of the first bracket is engaged with the first curved edge of the second bracket, the second curved lip of the first bracket is engaged with the second curved edge of the second bracket, and the third curved lip of the first bracket is engaged with the third L-shaped curved edge of the second bracket.

11. The towing hitch assembly according to claim 1, wherein the first bracket and second bracket are engaged so as to form a clamshell shaped mounting bracket.

12. The towing hitch assembly according to claim 1, wherein a cross-section of the towing hitch frame structure taken normal to a longitudinal axis of the towing hitch frame structure is a five sided polygon.

13. A method for mounting a towing hitch to a vehicle frame of a vehicle, comprising:
   providing a vehicle frame including a lower surface facing downward away from a bottom of the vehicle and a front surface facing away from a rear of the vehicle, a towing hitch frame structure including a towing hitch configured to connect to a vehicle trailer structure, the towing hitch frame structure having a front surface, a top surface, and a bottom surface, the front surface configured to face away from a rear of the vehicle, a primary bracket including a primary surface, and a secondary bracket including a secondary surface and an extension portion extending at a substantial angle with respect to the secondary surface;
   connecting the primary bracket to the secondary bracket such that the primary surface is spaced from the secondary surface;
   attaching at least one of the primary bracket and the secondary bracket to the vehicle frame such that at least one of the primary surface and the secondary surface extends along both the lower surface of the vehicle frame and the bottom surface of the towing hitch frame structure and the extension portion extends along the front surface of the towing hitch frame structure.

14. The method according to claim 13, wherein connecting the primary bracket to the secondary bracket includes at least one of welding, using an adhesive, and using at least one bolt.

15. The method according to claim 13, further including providing the towing hitch frame structure with a cross-section having a five sided polygonal shape, wherein the cross section is taken normal to a longitudinal axis of the towing hitch frame structure.

16. The method according to claim 13, further including providing an accessory attachment bracket disposed adjacent the front surface of the towing hitch frame structure.

17. A towing hitch assembly for mounting to a vehicle, comprising:
- a towing hitch frame structure, the towing hitch frame structure having a front surface, a top surface, and a bottom surface, the front surface configured to face away from a rear of the vehicle;
- a vehicle frame including a bottom surface configured to face away from a bottom of the vehicle and a front surface configured to face away from a rear of the vehicle, the bottom surface of the vehicle frame being substantially co-planar with the bottom surface of the towing hitch frame structure;
- a towing hitch located adjacent the towing hitch frame structure; and
- a mounting assembly configured to mount the towing hitch frame structure to the vehicle frame, the mounting assembly including a bracket structure that has a primary surface extending along and in contact with both the bottom surface of the vehicle frame and the bottom surface of the towing hitch frame structure, the bracket structure including an extension portion that includes a secondary surface that is configured at an angle greater than zero with respect to the primary surface and extends along and contacts the front surface of the towing hitch frame structure.

18. The towing hitch assembly according to claim 17, wherein the towing hitch frame structure is a cross beam extending between two different and spaced apart portions of the vehicle frame.

19. The towing hitch assembly according to claim 17, wherein the bracket structure includes a first bracket configured to be adjacent the vehicle frame, and a second bracket capable of receiving the first bracket, the second bracket extending along the bottom surface and the front surface of the towing hitch frame structure.

20. The towing hitch assembly according to claim 19, wherein the first bracket and the second bracket are welded together and form a space located between the first bracket and second bracket.

* * * * *